UNITED STATES PATENT OFFICE.

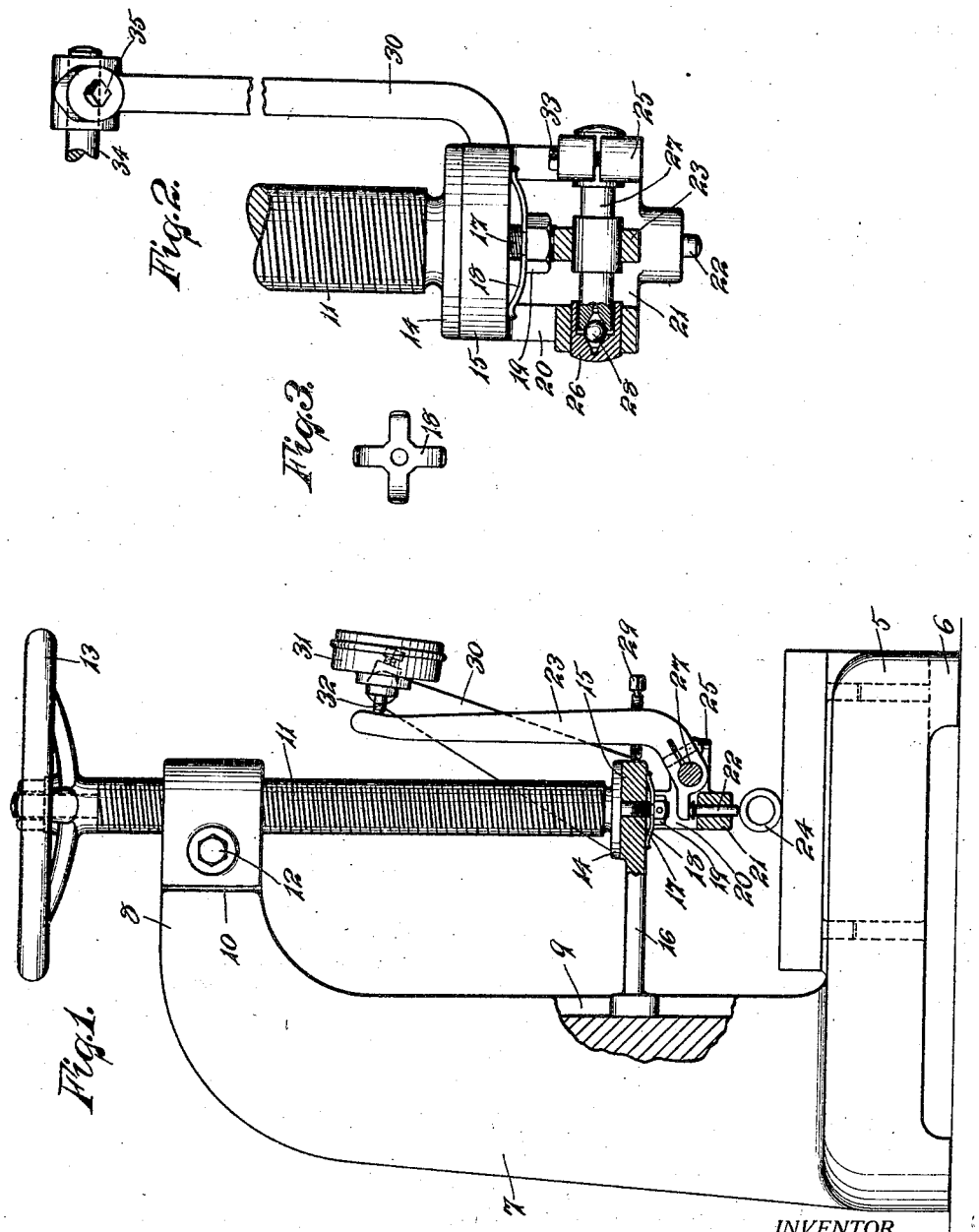

HUGH M. ROCKWELL, OF BRISTOL, CONNECTICUT, ASSIGNOR, BY MESNE ASSIGN-MENTS, TO STANDARD STEEL AND BEARINGS INCORPORATED, OF WILMINGTON, DELAWARE, A CORPORATION OF DELAWARE.

GAUGE.

1,415,054.  Specification of Letters Patent.  Patented May 9, 1922.

Application filed March 16, 1918. Serial No. 222,937.

*To all whom it may concern:*

Be it known that I, HUGH M. ROCKWELL, a citizen of the United States, residing at Bristol, in the county of Hartford and State of Connecticut, have invented a new and Improved Gauge, of which the following is a specification.

My invention relates to the class of devices above set out, and an object of my invention, among others, is to provide an indicator that shall be simple in construction and efficient in operation.

One form of indicator embodying my invention and in the construction and use of which the objects herein set out, as well as others, may be attained, is illustrated in the accompanying drawings, in which:

Figure 1 is a view in side elevation of an indicator embodying my invention, with parts broken away to show construction.

Figure 2 is a detail view, scale enlarged, illustrating the manner of mounting the indicator arm.

Figure 3 is a detail view of the spring washer.

In the accompanying drawings the numeral 5 indicates the table of my improved indicator that may be provided with legs 6 and which has a column 7 rising therefrom with an overhanging arm 8 at the upper end thereof. A guide groove 9 extends along one side of the column and the arm 8 is split at 10, which split extends into a threaded opening for a supporting screw 11, a clamp screw 12 extending across the split and serving to contract the supporting screw opening to clamp said supporting screw in place.

The supporting screw 11 has a hand wheel 13 at its upper end as a means for operating it and a flange 14 at its lower end providing a flat face for an indicator base or carrier 15 to rest against. A guide arm 16 projects from the base 15 into the groove 9 and serves to hold said base from turning movement and also to guide it in its movement caused by the screw 11, the screw thus serving as a means for positioning the base. A threaded stud 17 at the lower end of the screw 11 passes through a spring washer 18 and receives a nut 19 that holds the base 15 in place, the spring washer serving to always maintain a close contact between the base 15 and the flange 14, thus always maintaining a firm contact between the parts and consequently preserving the accuracy of the gauge.

Arms 20 project downwardly from the base 15 and they are joined by a bar 21 that has an opening for an indicating plunger 22 the upper end of which acts against an indicating lever 23 and the lower end of which plunger receives the article 24 to be measured. Bearing projections 25 extend from the arms 20 and have openings to receive bearing cases 26 recessed at their inner ends to receive the ends of a journal 27 extending through the lever 23. The opening for said journal in the lever 23 has a split part to receive a clamp screw by means of which the journal is secured to the lever, and as shown in Figure 1 of the drawings.

The ends of the journal and the bottoms of the recesses in the bearing cases are recessed to receive a bearing ball 28 for each end of the journal, and as shown in Figure 2 of the drawings. The cases 26 may be held in place in any suitable manner. A stop screw 29 extends through the lever 23 and abuts against the base 15 as a means for determining one position of said lever.

An indicator supporting arm 30 extends upwardly from the base 15 and the case 31 of an indicator is secured to the arm in any suitable manner. This indicator may be of any ordinary construction, embodying a plunger 32 which rests in contact with the end of the lever 23 and by means of which the plunger is operated, in a manner that will be readily understood.

In accordance with the provisions of the patent statues, I have described the principles of operation of my invention, together with the device which I now consider to represent the best embodiment thereof; but I desire to have it understood that the device shown is only illustrative, and that the invention can be carried out by other means.

In the form of the device herein shown the projections 25 are split as shown in Figure 2 of the drawings; and clamping screws 33 are employed for clamping the bearing cases 26 in place. A supporting rod 34, secured to and projecting from the case 31, extends into an opening in the upper end of the arm 30 and is secured as by means of a set screw 35.

I claim—

1. In a measuring instrument, a member having a surface against which an object to be measured may be placed, an indicator supporting member mounted for adjustment toward or from said surface, a screw for adjustably moving said member, an indicator carried by said supporting member, an indicator actuating means carried by said supporting member and arranged to engage an object interposed between said actuating means and said surface to thereby cause the indicator to show a measurement of said object.

2. In a gauge device, a framework, a screw mounted in said framework, an indicator supporting member carried by the screw, an indicator mounted on the supporting member, indicator actuating means mounted on said supporting member and said screw being operable to adjust the position of said supporting member to adapt said indicator actuating means to engage an object to be gaged.

3. In a gaging device, a framework, a positioning member mounted in said framework, a carrier, a means including a resilient member for attaching the carrier to the positioning member, and indicating mechanism mounted on said carrier, said positioning member functioning to position said carrier with relation to an object to provide for gaging the object.

4. In a gaging device, a framework, a screw mounted in said framework, a stud extending from the end of the screw, a carrier mounted on the stud, a spring washer mounted on the stud in contact with the carrier, means for holding the washer in position to hold the interposed carrier against the end of the screw, and indicating mechanism mounted on the carrier, the screw functioning to adjust the carrier and the indicating mechanism mounted thereon into operative relation with an object to be gaged.

5. In a gaging device, a framework, a guiding groove in the framework, a screw mounted in the framework, a carrier mounted on the screw and having a guide arm mounted to slide in said guiding groove, means for attaching the carrier to the screw, and indicating mechanism mounted on the carrier, the screw functioning to move the carrier with the indicating mechanism mounted thereon into operative relation with an object to be gaged.

HUGH M. ROCKWELL.